United States Patent
Yokoyama et al.

(10) Patent No.: US 10,298,796 B2
(45) Date of Patent: May 21, 2019

(54) INFORMATION PROCESSING APPARATUS, CONTROL METHOD THEREOF, AND STORAGE MEDIUM FOR CONTROLLING POWER STATE SHIFTING BASED ON AMPLITUDES OF RECEIVED SOUND WAVES

(71) Applicant: CANON KABUSHIKI KAISHA, Tokyo (JP)

(72) Inventors: Junnosuke Yokoyama, Toride (JP); Manabu Hada, Kawasaki (JP); Yusuke Horishita, Nagareyama (JP); Michio Fukushima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/656,196

(22) Filed: Jul. 21, 2017

(65) Prior Publication Data
US 2018/0034995 A1    Feb. 1, 2018

(30) Foreign Application Priority Data

Jul. 29, 2016  (JP) ................. 2016-150360

(51) Int. Cl.
*H04N 1/00* (2006.01)
*G01S 15/88* (2006.01)

(52) U.S. Cl.
CPC ......... *H04N 1/00896* (2013.01); *G01S 15/88* (2013.01); *H04N 2201/0094* (2013.01)

(58) Field of Classification Search
CPC ........ H04N 1/00896; H04N 2201/0094; G01S 15/88; G03G 15/5004
See application file for complete search history.

(56) References Cited

U.S. PATENT DOCUMENTS

2005/0046584 A1* 3/2005 Breed ............... B60C 11/24
                                              340/13.31
2009/0268553 A1* 10/2009 Ecker ................ G01S 7/003
                                              367/119
(Continued)

FOREIGN PATENT DOCUMENTS

JP     2015-195548 A     11/2015

OTHER PUBLICATIONS

U.S. Appl. No. 15/642,678, filed Jul. 6, 2017. Applicant: Yusuke Horishita, et al.

*Primary Examiner* — G. M. A Hyder
(74) *Attorney, Agent, or Firm* — Venable LLP

(57) ABSTRACT

An information processing apparatus including: a sound wave sensor that outputs a sound wave and receives a reflected wave of the output sound wave; a control unit configured to measure an amplitude of a sound wave, at predetermined time intervals, which is received by the sound wave sensor after the sound wave sensor outputs a sound wave; and a power control unit configured to shift the information processing apparatus from a first power state into a second power state where power consumption is larger than that in the first power state, on a basis that the amplitude of the sound wave measured by the control unit is larger than or equal to a threshold value, wherein in a case where a number of times amplitude of a sound wave measured by the control unit is larger than or equal to the threshold value during a predetermined period of time is larger than or equal to a predetermined number of times, the control unit maintains the power state of the information processing apparatus in the first power state.

10 Claims, 11 Drawing Sheets

(56) References Cited

U.S. PATENT DOCUMENTS

| | | | | |
|---|---|---|---|---|
| 2012/0127518 A1* | 5/2012 | Ogata | G06F 1/3231 | 358/1.15 |
| 2012/0127538 A1* | 5/2012 | Mamiya | G06F 1/3231 | 358/442 |
| 2012/0204046 A1* | 8/2012 | Baba | G06F 1/3231 | 713/323 |
| 2013/0073887 A1* | 3/2013 | Miki | G06F 1/3231 | 713/323 |
| 2013/0300198 A1* | 11/2013 | Yamashina | H02J 9/005 | 307/39 |
| 2014/0002843 A1* | 1/2014 | Miyamoto | H04N 1/00896 | 358/1.13 |
| 2014/0157032 A1* | 6/2014 | Yokoyama | G06F 1/3215 | 713/323 |
| 2014/0376941 A1* | 12/2014 | Okuzono | G03G 15/5004 | 399/75 |
| 2015/0227328 A1* | 8/2015 | Yokoyama | G06F 3/1221 | 358/1.14 |
| 2015/0234474 A1* | 8/2015 | Yokoyama | G06F 1/26 | 713/323 |
| 2015/0253719 A1* | 9/2015 | Matsumoto | G03G 15/80 | 399/75 |
| 2015/0261168 A1* | 9/2015 | Yokoyama | G03G 15/80 | 399/81 |
| 2015/0278665 A1* | 10/2015 | Imamura | G06K 15/4055 | 358/1.14 |
| 2016/0070222 A1* | 3/2016 | Fukushima | G03G 15/5004 | 399/88 |
| 2016/0142575 A1* | 5/2016 | Yokoyama | H04N 1/00896 | 358/1.15 |
| 2016/0191746 A1* | 6/2016 | Yokoyama | H04N 1/442 | 358/1.14 |
| 2016/0219174 A1* | 7/2016 | Umeda | H04N 1/00891 | |
| 2017/0013155 A1* | 1/2017 | Yokoyama | H04N 1/00891 | |
| 2017/0160686 A1* | 6/2017 | Tanaka | G03G 15/5058 | |
| 2018/0031700 A1* | 2/2018 | Horishita | G01S 15/04 | |
| 2018/0032013 A1* | 2/2018 | Fukushima | G03G 15/5004 | |
| 2018/0203651 A1* | 7/2018 | Fukushima | G03G 15/5004 | |

* cited by examiner

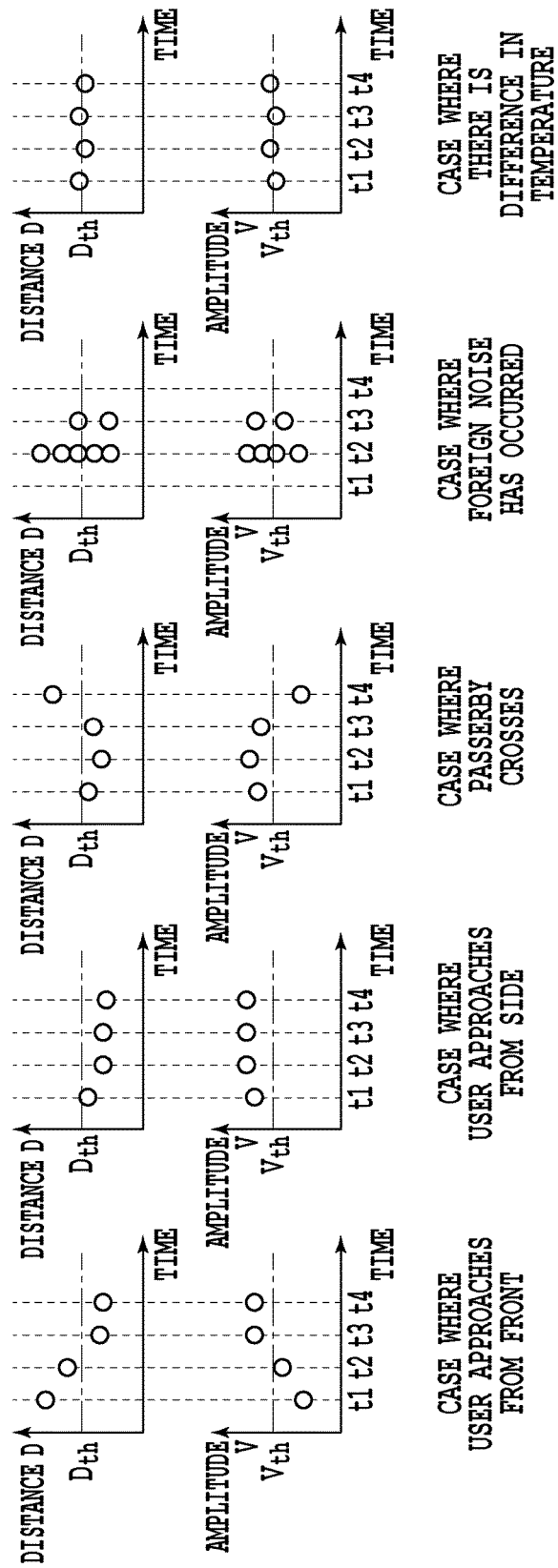

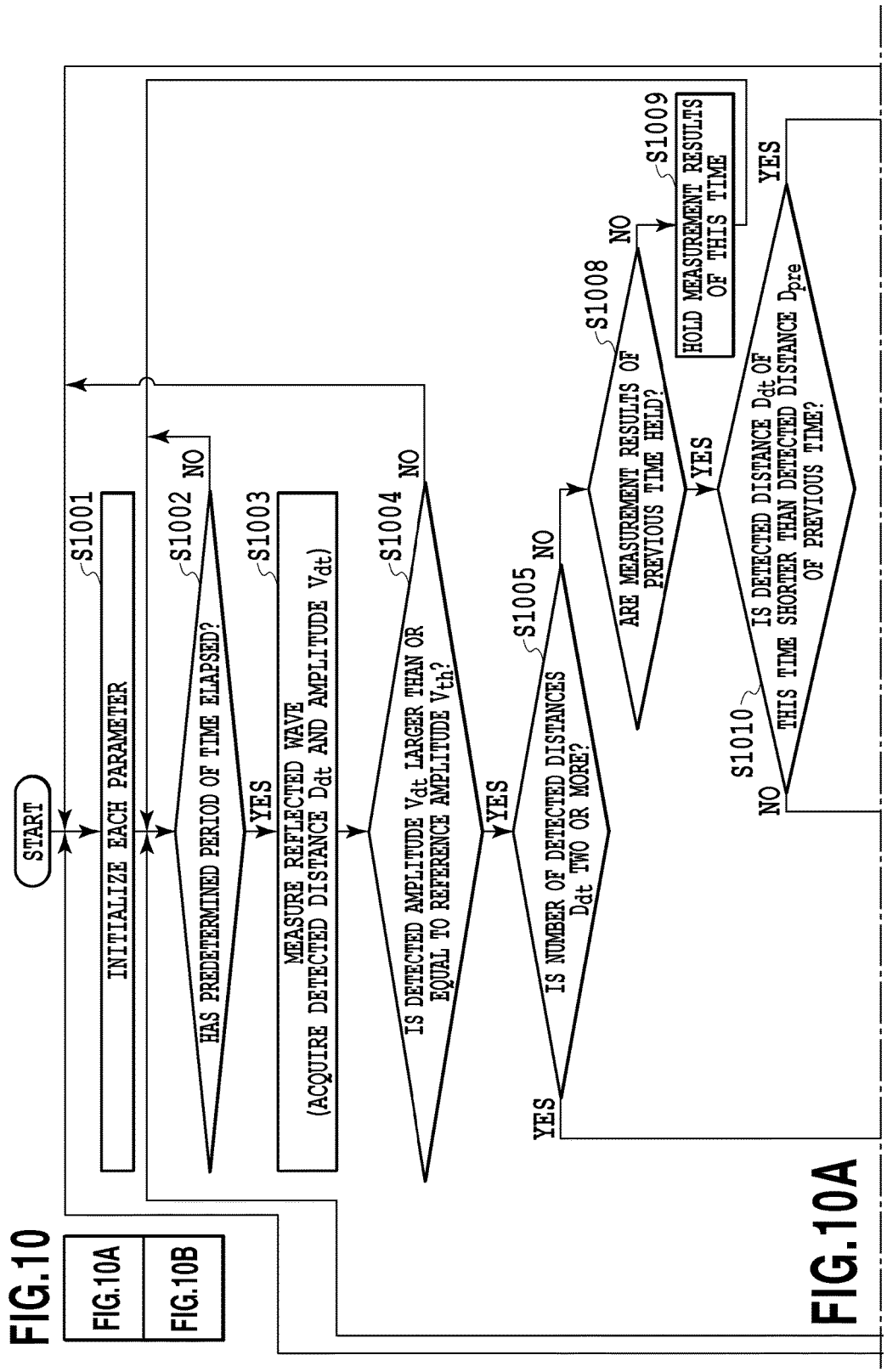

INFORMATION PROCESSING APPARATUS, CONTROL METHOD THEREOF, AND STORAGE MEDIUM FOR CONTROLLING POWER STATE SHIFTING BASED ON AMPLITUDES OF RECEIVED SOUND WAVES

BACKGROUND OF THE INVENTION

Field of the Invention

The present invention relates to a technique to prevent erroneous detection due to foreign noise in human body detection using an ultrasonic sensor.

Description of the Related Art

In recent years, in many electronic apparatuses, such as a printer, a human sensor function to determine whether a person is a user or a passerby by measuring the distance from the electronic apparatus to the human body is mounted. As a sensor to implement this human sensor function, for example, an ultrasonic sensor is used (see Japanese Patent Laid-Open No. 2015-195548).

The ultrasonic sensor is a sensor that detects an object by radiating an ultrasonic wave and receiving a reflected wave that returns. At the time of detecting a human body by this ultrasonic sensor, there is a case where something that is not a human body is erroneously detected as a human body despite that the received reflected wave does not result from a human body. As the case where something that is not a human body is erroneously detected as a human body, mention is made of, for example, a case where so-called foreign noise, such as sound produced by collision of a metal and sound produced by ejection of contents from a spray can, is detected.

Further, within a space where temperature changes rapidly, because an ultrasonic wave radiated from the ultrasonic sensor is refracted, the radiated ultrasonic wave (direct wave) and its reflected wave are not stable, and therefore, there is a case where this is erroneously detected as a moving person.

SUMMARY OF THE INVENTION

The information processing apparatus according to the present invention is an information processing apparatus including: a sound wave sensor that outputs a sound wave and receives a reflected wave of the output sound wave; a control unit configured to measure an amplitude of a sound wave, at predetermined time intervals, which is received by the sound wave sensor after the sound wave sensor outputs a sound wave; and a power control unit configured to shift the information processing apparatus from a first power state into a second power state where power consumption is larger than that in the first power state, on a basis that the amplitude of the sound wave measured by the control unit is larger than or equal to a threshold value, wherein in a case where a number of times amplitude of a sound wave measured by the control unit is larger than or equal to the threshold value during a predetermined period of time is larger than or equal to a predetermined number of times, the control unit maintains the power state of the information processing apparatus in the first power state.

Further features of the present invention will become apparent from the following description of exemplary embodiments with reference to the attached drawings.

BRIEF DESCRIPTION OF THE DRAWINGS

FIGS. 9A to 9E are diagrams that put together detection results of an ultrasonic sensor in each situation.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

Figure 1:
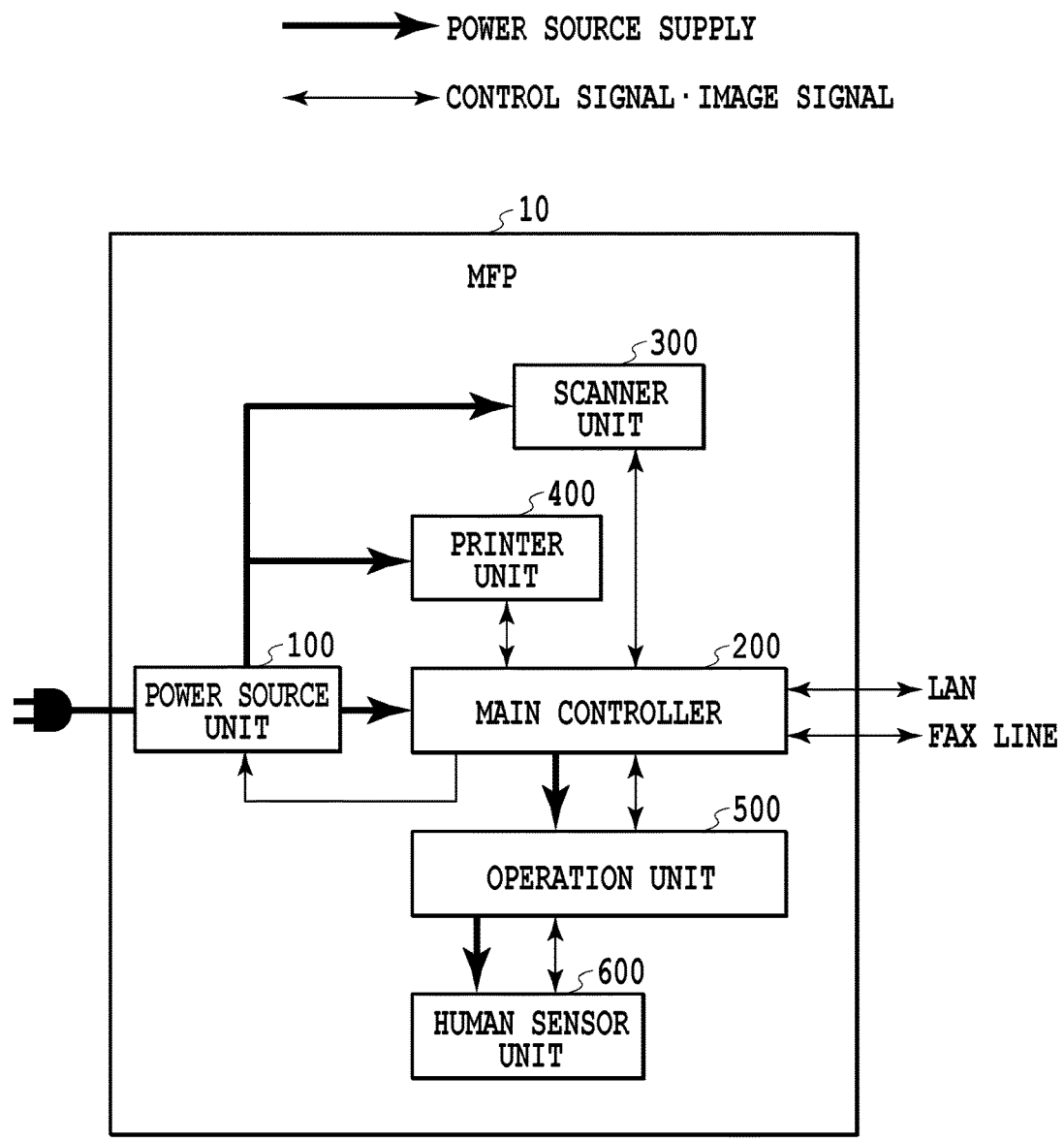
FIG. 1 is an outline block diagram of a multi function printer (MFP) that mounts a human sensor function.

FIG. 1 is an outline block diagram of a multi function printer (MFP) as an electronic apparatus that mounts a human sensor function according to the present embodiment. An MFP 10 includes a plurality of functions, such as a print function, a scanner function, a copy function, and a FAX function. The MFP 10 includes a power source unit 100, a main controller 200, a scanner unit 300, a printer unit 400, an operation unit 500, and a human sensor unit 600. The MFP 10 has at least two modes as a power mode, specifically, a standby mode that is a state where the normal operation of the MFP 100, such as the copy operation and the scan operation, can be performed and a sleep mode in which power consumption is suppressed more than that in the standby mode. For example, in the case where the MFP 10 is not used by a user for a predetermined period of time, the main controller 200 shifts the above-described power mode from the standby mode into the sleep mode by controlling the power source unit 100. In the sleep mode, the power source supply to the scanner unit 300, the printer unit 400, and so on, is suspended and to the main controller 200 and the operation unit 500 also, the power source supply is suspended except for part thereof. In the sleep mode also, the human sensor unit 600 is maintained in the operable state, and detects whether a user of the MFP 10 is within a predetermined range and performs control to resume the standby mode from the sleep mode.

Figure 2:
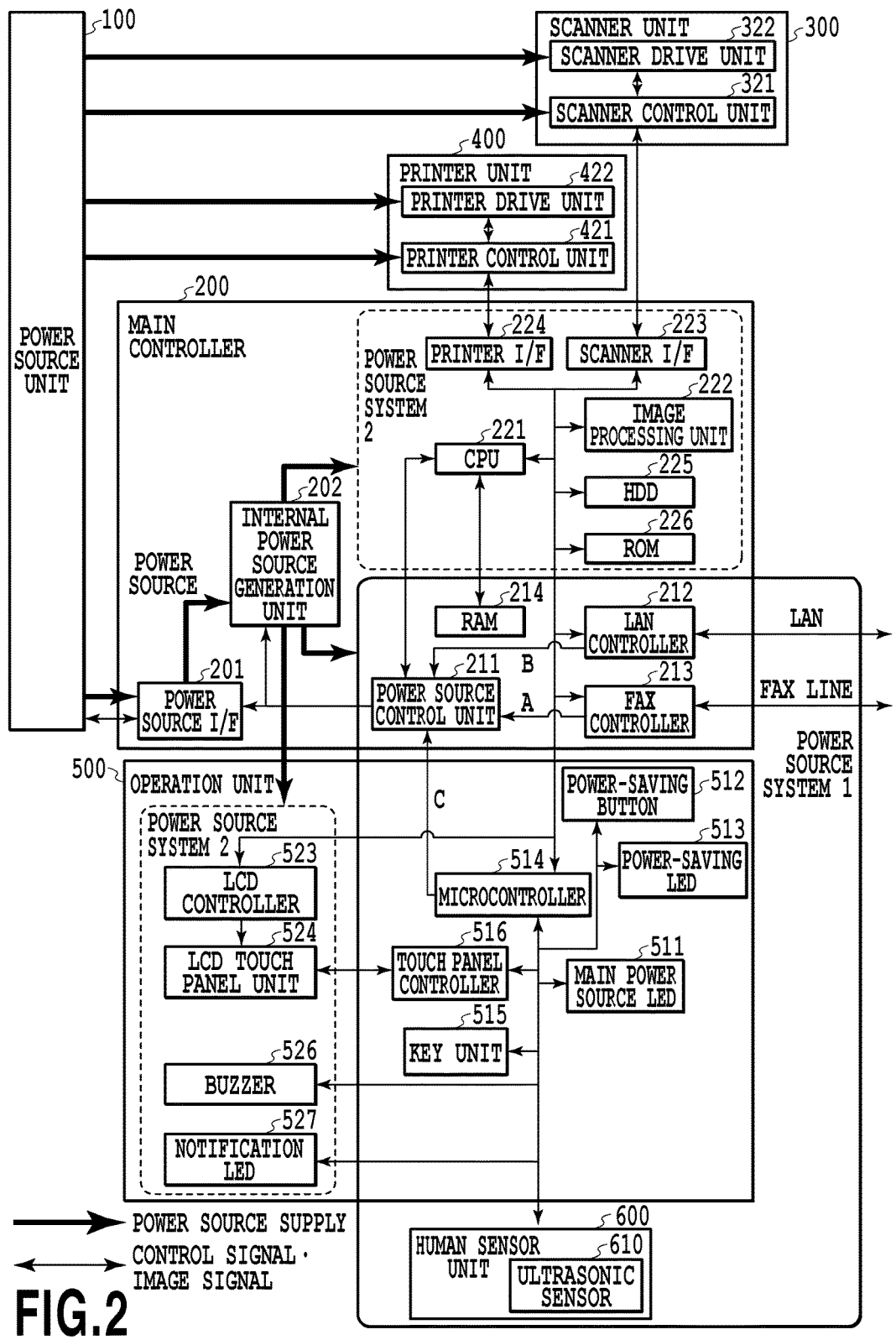
FIG. 2 is a block diagram showing details of each unit included in the MFP.

FIG. 2 is a block diagram showing details of each unit (power source unit 100, main controller 200, scanner unit 300, printer unit 400, operation unit 500, human sensor unit 600) described above included in the MFP 10.

The scanner unit 300 generates image data by optically reading a document set on an ADF (Auto Document Feeder) or the like, not shown schematically. The scanner unit 300 includes a scanner control unit 321 and a scanner drive unit 322. The scanner drive unit 322 includes a drive mechanism to move a read head to read a document, a drive mechanism to convey a document to a reading position, and so on. The scanner control unit 321 receives setting information relating to scanner processing set by a user from the main controller 200 and controls the operation of the scanner drive unit 322 based on the setting information.

The printer unit 400 forms an image on a printing medium (sheet) in accordance with, for example, an electrophotographic scheme. The printer unit 400 includes a printer control unit 421 and a printer drive unit 422. The printer drive unit 422 includes a motor to rotate a photoconductor drum, a mechanism unit configured to apply pressure to a fixing unit, a heater, and so on. The printer control unit 421 receives setting information relating to printing processing set by a user from the main controller 200 and controls the operation of the printer drive unit 422 based on the setting information.

The main controller 200 has a function to centralizedly control the MFP 10 and includes configurations (CPU, ROM, RAM, and so on) therefor. The main controller 200 performs various operations, for example, performing necessary image processing for image data input from a FAX line and outputting the image data, and copying, scanning, printing, and so on, in accordance with user instructions given to the operation unit 500. Further, the main controller 200 also switches the above-described power modes by controlling the power source unit 100.

The inside of the main controller 200 is divided into at least two kinds of system: a power source system 1 that needs to be maintained in the operable state also in the sleep mode and a power source system 2 that does not need to be maintained in the operable state in the sleep mode. By an internal power source generation unit 202 that receives power source supply from a power source I/F 201, power is supplied to the power source system 1 at all times. To the power source system 1, a power source control unit 211, a FAX controller 213, and a LAN controller 212 are connected so that it is possible to react in the case of FAX reception or in the case where a request for printing is made via a network even in the sleep mode. On the other hand, to the power source system 2, a scanner I/F 223, a printer I/F 224, and an HDD 225 are connected, in addition to a ROM 226 that stores programs and the like that are necessary at the time of activation and an image processing unit 222 configured to perform image processing necessary at the time of the operation, such as copying. To each unit connected to the power source system 2, power is not supplied in the sleep mode. In the case where one of interrupt signals A to C is input from the connection destination in the sleep mode, the power source control unit 211 supplies power to the power source system 2 by controlling the internal power source generation unit 202 and shifts the sleep mode into the standby mode.

Here, the interrupt signal A is a signal that is output in response to the FAX controller 213 receiving a FAX from the FAX line. The interrupt signal B is a signal that is output in response to the LAN controller 212 receiving a print job packet or a state check packet from the LAN. The interrupt signal C is a signal that is output from a microcontroller 514 inside the operation unit 500 and is also a signal that is output in the case where the human sensor unit 600 detects a user or at the time of a power-saving button 512 being pressed down. In the case where power supply to the power source system 2 within the main controller 200 is started by these interrupt signals A to C, a CPU 221 reads state information to cause the MFP 10 to resume the state before the shift into the sleep mode from a RAM 214 having been performing a self-refresh operation at all times. After this, in the case where the normal power mode is resumed, processing in accordance with the cause of resumption of the interrupt signals A to C is performed by the CPU 221.

The operation unit 500 includes an LCD touch panel unit 524 in which an LCD panel and a touch panel are integrated into one unit, a key unit 515 configured to detect an operation of a key, such as a ten-key and a start key, by a user, and a buzzer 526. On the LCD touch panel unit 524, image data on a UI screen generated by the main controller 200 is drawn by an LCD controller 523. By a user operating the UI screen displayed on the LCD touch panel unit 524 by touching it, a touch panel controller 516 analyzes data of coordinates of the portion touched by the user and notifies the microcontroller 514 of the analysis results and the microcontroller 514 further notifies the CPU 221 of the analysis results. The microcontroller 514 periodically checks the presence/absence of the user operation to the key unit 515 and notifies the CPU 221 of the user operation in the case where the user operation is checked. The CPU 221 notified of the user operation to the LCD touch panel unit 524 and the key unit 515 causes the MFP 10 to operate in accordance with the operation contents.

In the operation unit 500, a plurality of kinds of LED is incorporated, such as a notification LED 527, a main power source LED 511, and a power-saving LED 513. The main power source LED 511 is an LED that remains in the turned-on state at all times while the main power source of the MFP 10 is in the turned-on state. The notification LED 527 is an LED that is controlled by the microcontroller 514 and which notifies a user of the state of the MFP 10, such as a job-executing state and a state where an error has occurred. The inside of the operation unit 500 is also divided into at least two kinds of system: the power source system 1 that needs to be maintained in the operable state also in the sleep mode and the power source system 2 that does not need to be maintained in the operable state in the sleep mode. To the power source system 1, the microcontroller 514, the main power source LED 511, the power-saving button 512, the power-saving LED 513, the touch panel controller 516, and the key unit 515 are connected and power is supplied also in the sleep mode. To the power source system 2, the LCD controller 523, the LCD touch panel unit 524, the buzzer 526, and the notification LED 527 are connected and power supply is suspended in the sleep mode.

The human sensor unit 600 is connected to the power source system 1 to which power is supplied also in the sleep mode and it is possible to detect the movement of a person by an ultrasonic sensor 610 even in the sleep mode. That is, by the microcontroller 514 periodically reading the state of the ultrasonic sensor 610 and performing processing, a movement of a person is detected. In the present embodiment, as the ultrasonic sensor 610, a type of sensor that performs the operation of radiation (oscillation outputting) and reception of an ultrasonic wave by one element is premised, but a type of sensor whose configuration is such that the element for radiation and the element for reception are provided separately may be accepted.

The microcontroller 514 is a compact control computer that incorporates a CPU, a memory, a timer, and so on, in one chip. The microcontroller 514 inputs an ultrasonic oscillation output signal to the ultrasonic sensor 610 and then determines the existence of a human body (user) by processing detection results of a reflected wave input to the ultrasonic sensor 610. Then, in the case of determining that a user as a person expected to have the intension of using the MFP 10 exists, the microcontroller 514 outputs the interrupt signal C to the power source control unit 211. These pieces of processing are implemented by the internal CPU reading and executing control programs stored in the internal ROM. Upon receipt of the interrupt signal C, the power source control unit 211 causes the MFP 10 to resume the standby mode from the sleep mode by controlling the power source unit 100. It may also be possible to directly supply a power source to the human sensor unit 600 from the power source unit 100. Further, in the present embodiment, the microcontroller 514 is incorporated in the operation unit 500 and integrated with the MFP 10 into one unit, but it may also be possible to configure a mechanism that performs user detection control based on the measurement results of the ultrasonic sensor 610, to be explained below, as an apparatus independent of the MFP 10.

Figure 3A:
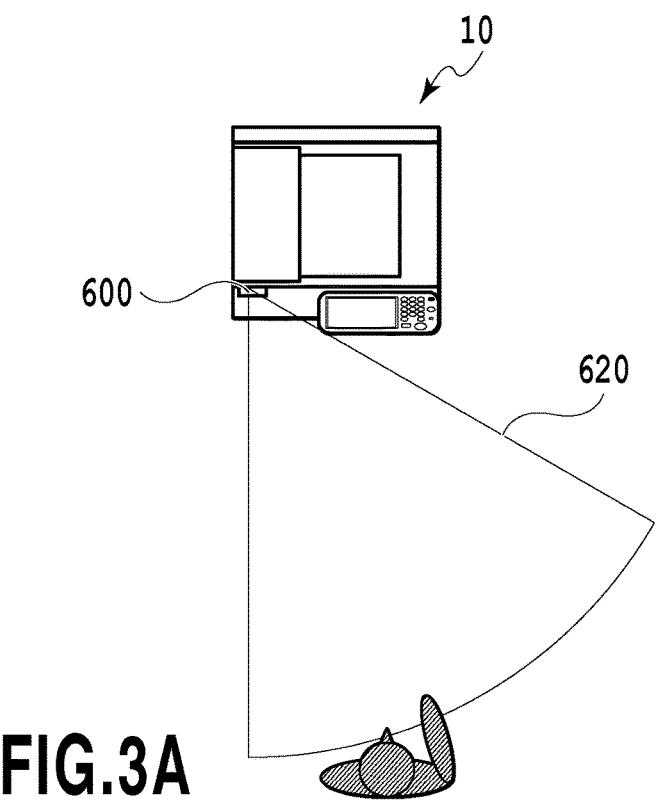
FIG. 3A and FIG. 3B are each a diagram showing a detection area of a human sensor unit.
Figure 3B:
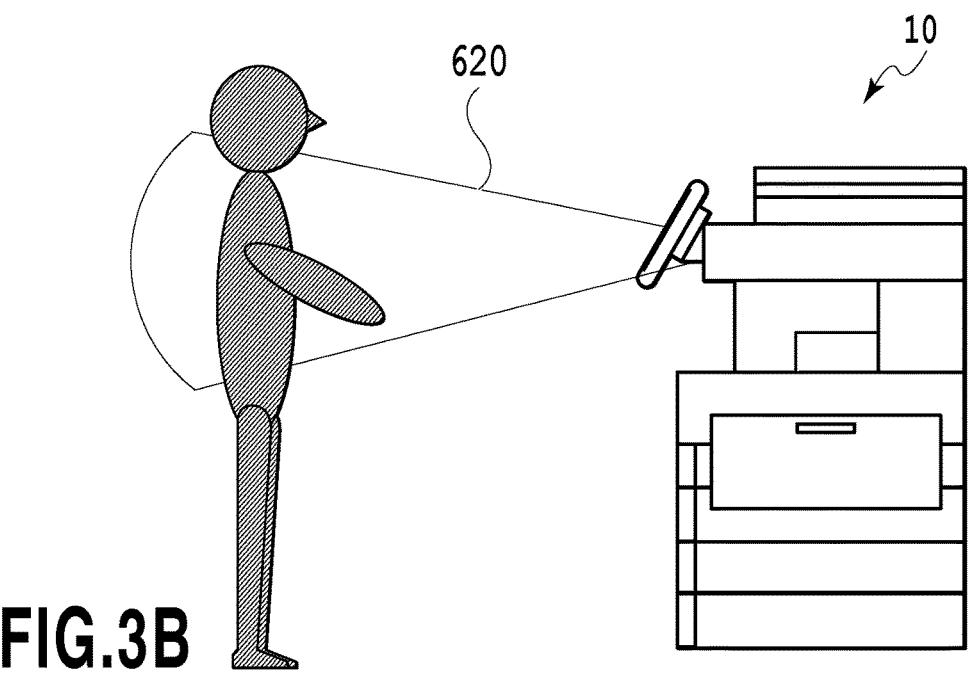

FIGS. 3A and 3B are diagrams showing a detection area of the human sensor unit 600. The human sensor unit 600 radiates an ultrasonic wave at a predetermined frequency (e.g., 400 kHz) from the ultrasonic sensor 610 and receives a reflected wave that hits an object and returns, and estimates the distance to the object based on the time elapsed between the radiation and the reception. FIG. 3A is a diagram in the case where the MFP 10 is viewed from the above and FIG. 3B is a diagram in the case where the MFP 10 is viewed from the side and a sectoral portion 620 indicates a detection area. In the present embodiment, the detection area of the human sensor unit 600 (ultrasonic sensor 610) is set in front of the MFP 10 (or in front of the MFP 10 in somewhat downward direction), and thereby, the ultrasonic wave that hits and is reflected from the human body is detected. Then, it is assumed that the detection area 620 is set so that detection is possible in two stages, i.e., a first stage in which a person existing at a distance shorter than that of a position about 2 m apart from the casing of the MFP 10 is detected and a second stage in which a person existing within an area in front of the casing about 50 cm distant therefrom and whose width is the same as the casing width is detected.

(Detection Aspect 1)

Figure 4:
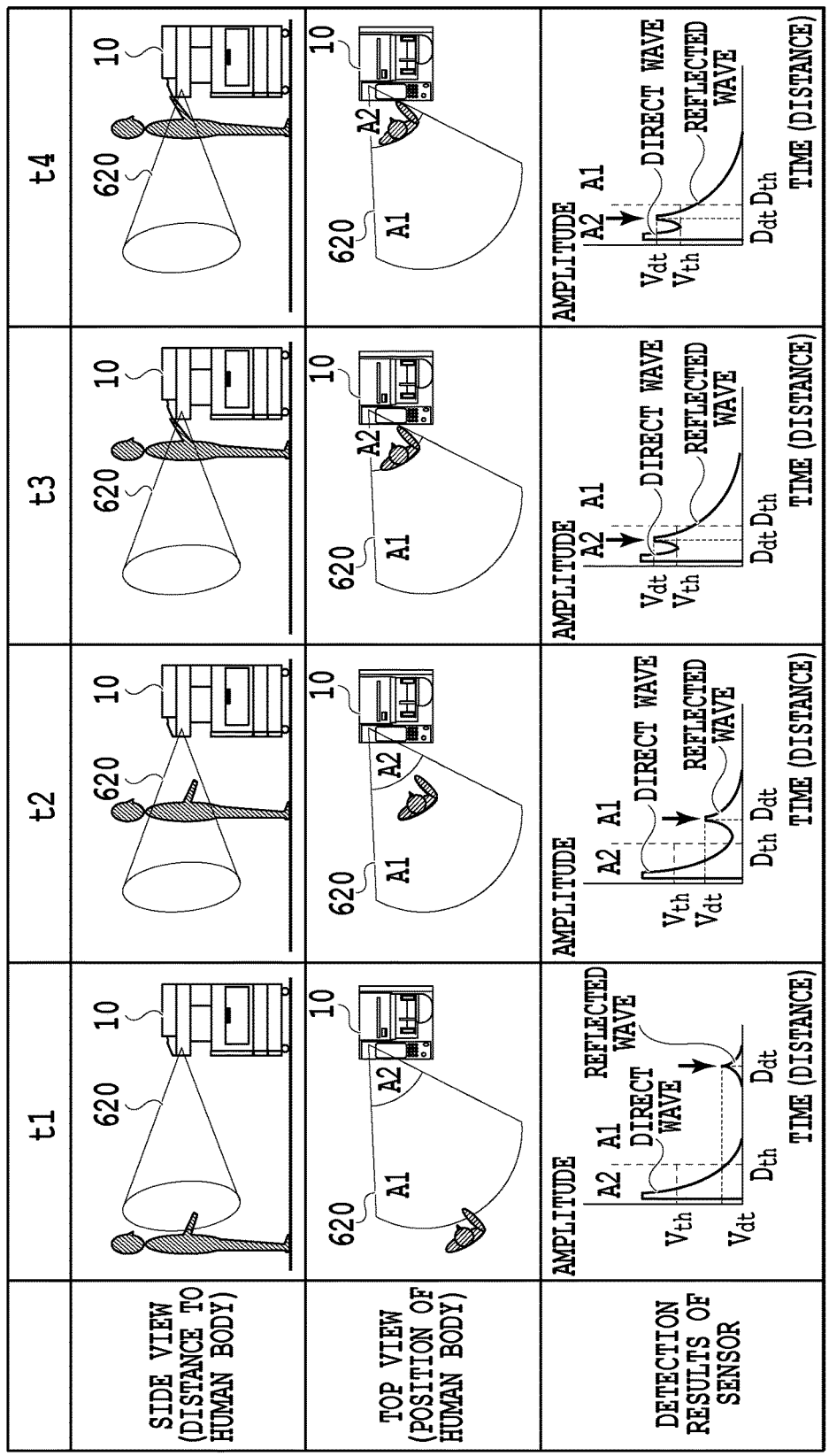
FIG. 4 is a table showing detection results of an ultrasonic sensor in time series in the case where a user approaches the MFP from the front.

FIG. 4 is a table showing a position relationship between the MFP 10 and a human body and detection results by the ultrasonic sensor 610 in time series in the case where a user approaches the MFP 10 from the front. The top row of the table indicates the distance from the MFP 10 to the human body in the case where viewed in the direction parallel to the floor and the middle row of the table indicates the position relationship between the MFP 10 and the human body in the case where viewed in the direction perpendicular to the floor, i.e., in the case where viewed from a bird' eye. In the table in FIG. 4, t1 indicates a point in time at which a person enters an area A1 within the detection area 620, t2 indicates a point in time at which the person moves within the area A1 and further approaches the MFP 10, t3 indicates a point in time at which the person enters an area A2 and reaches the front of the MFP 10, and t4 indicates a point in time at which the use of the MFP 10 is started, respectively. In the detection results of the ultrasonic sensor 610, the direct wave and the reflected wave appear. The ultrasonic sensor 610 suspends radiation after a predetermined period of time elapses after radiation of ultrasonic waves for a predetermined period of time and detects the sound pressure intensity of the ultrasonic wave that is input to the ultrasonic sensor 610 as a voltage (amplitude) $V_{dt}$. First, the amplitude of the direct wave is detected without exception because its vibrations remain in the sensor itself immediately after the radiation of ultrasonic waves. Then, in the case where there is a reflected wave from an object, the amplitude of the reflected wave is detected, in addition to the direct wave. In each graph shown in the bottom row of the table in FIG. 4, the horizontal axis represents the elapsed time after the direct wave is output and the vertical axis represents the amplitude of the detected reflected wave. In the following, detailed explanation is given based on the table in FIG. 4.

First, at the point in time t1 at which a user enters the area A1 where the human body is detected in the first stage in the detection area 620, the amplitude $V_{dt}$ is detected. At this time, the amplitude $V_{dt}$ is detected at a point in time at which the time from the output of the direct wave to the time indicated by an arrow in the downward direction elapses. The time indicated by the arrow in the downward direction is the time taken from the radiation of an ultrasonic wave until the ultrasonic wave travels to the human body and returns from the human body by being reflected therefrom, and therefore, the time corresponds to the distance from the ultrasonic sensor 610 to the human body. Consequently, in the following explanation, the time taken from the radiation of an ultrasonic wave until the reflected wave is detected is described as a detected distance $D_{dt}$.

As shown in the table in FIG. 4, in the case where the reflected wave is detected at a distance longer than a reference distance $D_{th}$ determined in advance, it is determined that a person is in the area A1 and in the case where the reflected wave is detected at a distance shorter than the reference distance $D_{th}$, it is determined that the person is in the area A2. As described above, in the present embodiment, the reference distance $D_{th}$=about 50 cm is assumed. Here, at the point in time (t1) at which the person enters the area A1, the reflected wave diffuses and it is not possible to receive all the reflected waves, and therefore, the detected amplitude $V_{dt}$ attenuates and is small. At the point in time T2 at which the person moves from the position at the point in time t1 and approaches the MFP 10, the detected distance $D_{dt}$ becomes shorter and the detected amplitude $V_{dt}$ at this time also changes to a larger value. Here, it is assumed that the amplitude of the reflected wave detected at the time of the above-described reference distance $D_{th}$ is set as a reference amplitude $V_{th}$ in advance. Then, at the points in time t1 and t2, the detected distance $D_{dt}$ and the detected amplitude $V_{dt}$ at this time do not exceed the reference distance $D_{th}$ and the reference amplitude $V_{th}$, respectively. That is, at the points in time t1 and t2, despite that the human body is detected within the detection area 620, it is determined that a user expected to have the intention of using the MFP 10 does not exist yet, and therefore, the sleep mode is maintained.

Then, at the point in time t3 at which the person further moves from the position at the time in point t2 and enters the area A2 located at the position nearer to the MFP 10, the detected distance $D_{dt}$ becomes shorter than the reference distance $D_{th}$ and the detected amplitude $V_{dt}$ also becomes larger than the reference amplitude $V_{th}$. After this, at the point in time t4 at which a predetermined period of time elapses from the time in point t3, in the case where the detected distance $D_{dt}$ is shorter than the reference distance $D_{th}$ and the detected amplitude $V_{dt}$ is larger than the reference amplitude $V_{th}$, the MFP 10 cancels the sleep mode. That is, in the case where the state at the point in time t3 continues for a predetermined period of time (e.g., 500 msec), it is determined that a user expected to have the intention of using the MFP 10 exists, and the power mode is switched from the sleep mode into the standby mode.

(Detection Aspect 2)

Figure 5:
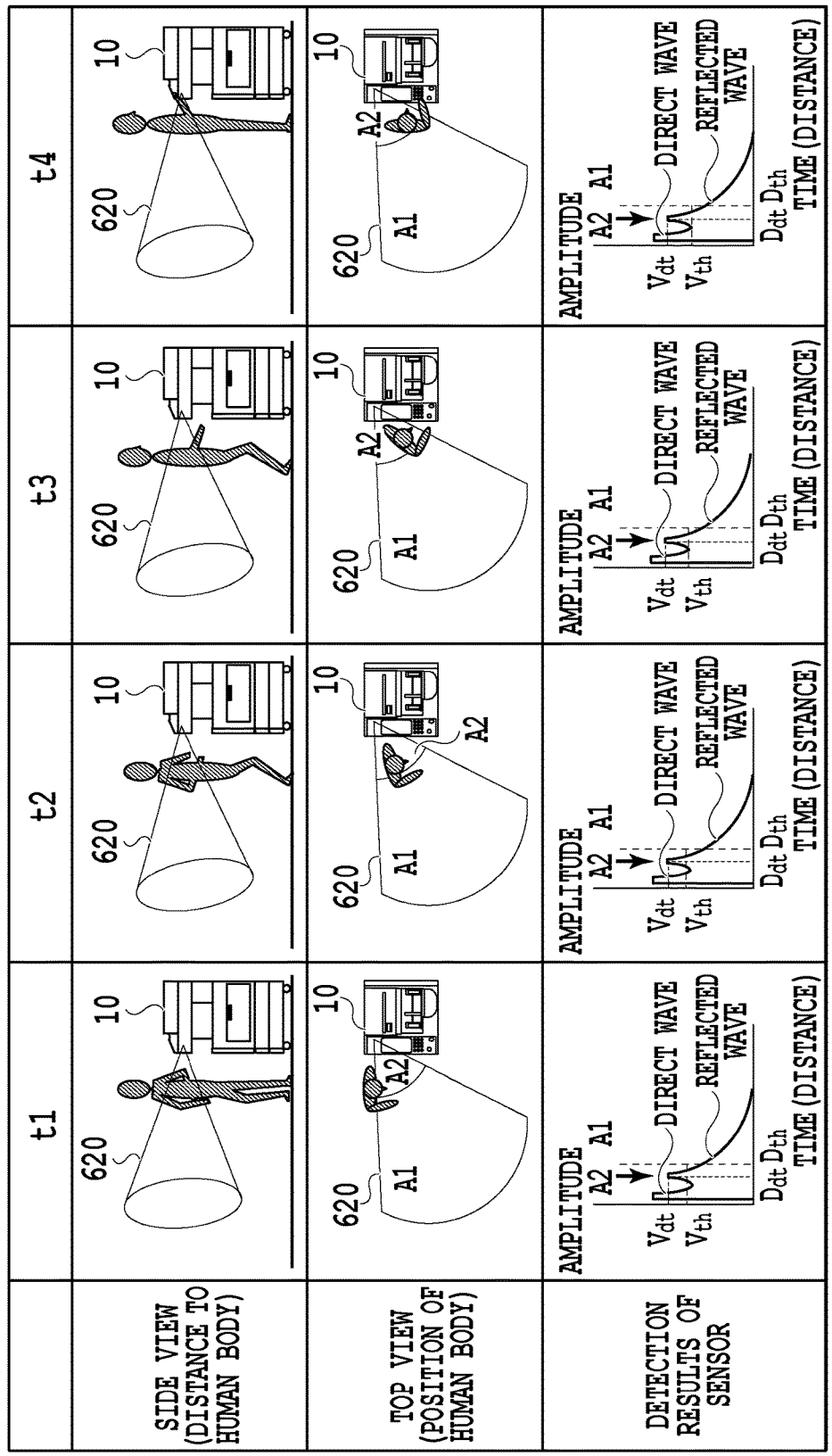
FIG. 5 is a table showing detection results of an ultrasonic sensor in time series in the case where a user approaches the MFP from the side.

FIG. 5 is a table showing a position relationship between the MFP 10 and a human body and detection results by the ultrasonic sensor 610 in time series in the case where a user approaches the MFP 10 from the side. In the table in FIG. 5, t1 indicates a point in time at which a person enters the area A2 within the detection area 620, t2 indicates a point in time at which the person begins to turn his/her body toward the MFP 10 within the area A2, t3 indicates a point in time at which the person almost completes turning his/her body toward the MFP 10, and t4 indicates a point in time at which the use of the MFP 10 is started, respectively. In the case of the detection aspect 2, at the point in time t1, the person is detected within the area A2, which is in the front of the apparatus. Consequently, at the point in time t1, the detected distance $D_{dt}$ of the reflected wave is shorter than the reference distance $D_{th}$ and the detected amplitude $V_{dt}$ is larger than the reference amplitude $V_{th}$. Then, at the points in time t2 and t3 also, the detected distance $D_{dt}$ remains shorter than the reference distance $D_{th}$ and detected amplitude $V_{dt}$ also remains larger than the reference amplitude $V_{th}$. After this, also at the point in time t4 at which a predetermined period of time elapses from the point in time of t3, in the case where the detected distance $D_{dt}$ remains shorter than the reference distance $D_{th}$ and the detected amplitude $V_{dt}$ remains larger than the reference amplitude $V_{th}$, the MFP 10 cancels the sleep mode. That is, it is determined that the user expected to have the intention of using the MFP 10 exists and the power mode is shifted into the standby mode.

(Detection Aspect 3)

Figure 6:
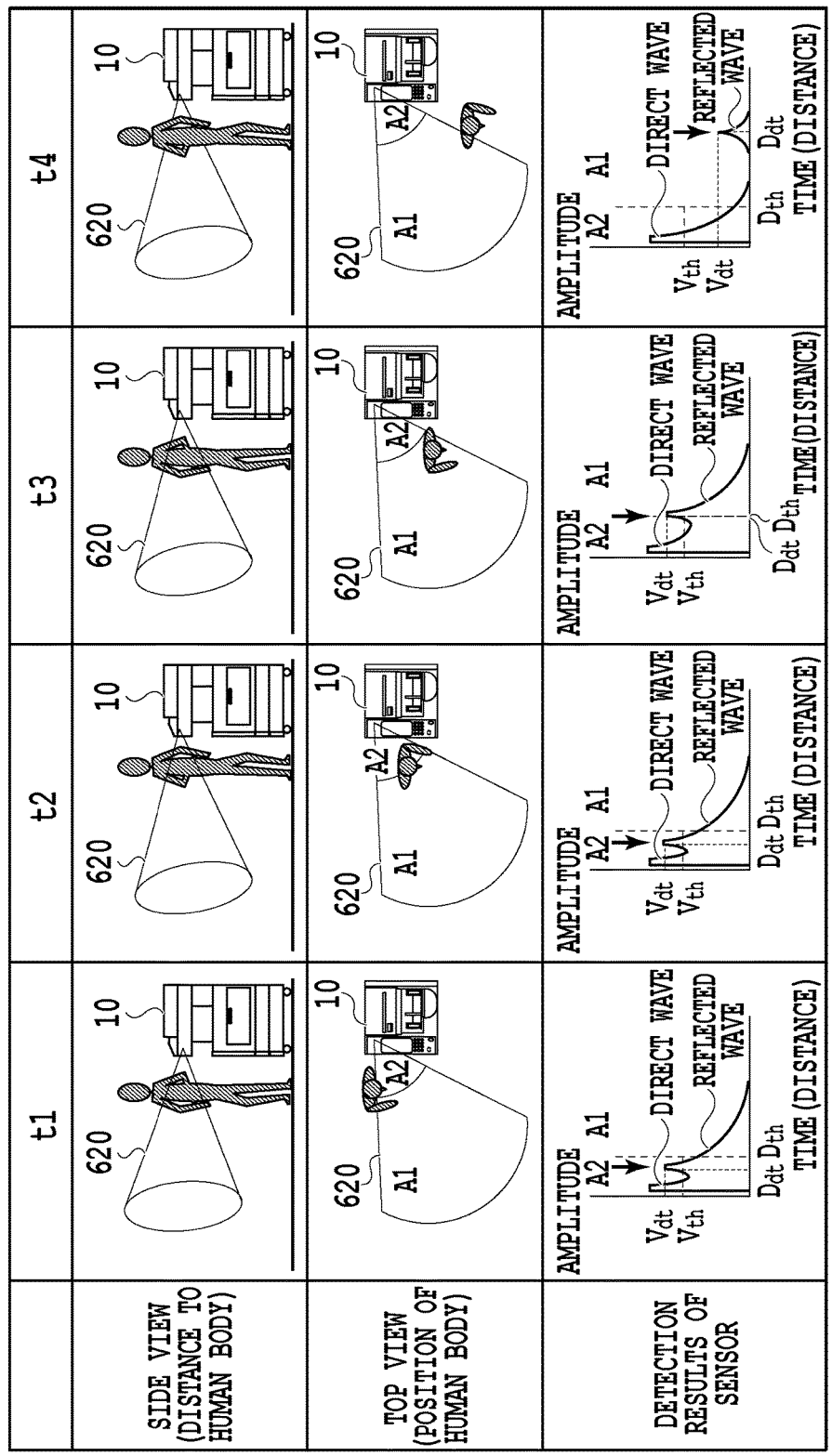
FIG. 6 is a table showing detection results of an ultrasonic sensor in time series in the case where a user crosses in front of the MFP.

FIG. 6 is a table showing a position relationship between the MFP 10 and a human body and detection results by the ultrasonic sensor 610 in time series in the case where a person crosses in front of (passes by) the MFP 10. In the table in FIG. 6, t1 indicates a point in time at which the person enters the area A2 within the detection area 620, t2 indicates a point in time at which the person further moves straight within the area A2, t3 indicates a point in time at which the person leaves the area A2 and moves to the area A1, and t4 indicates a point in time at which the person leaves the detection area 620, respectively. In the case of this detection aspect 3, at the point in time t1, as in the detection aspect 2, the person is detected within the area A2, which is in front of the apparatus. Consequently, at the point in time t1, the detected distance $D_{dt}$ of the reflected wave is shorter than the reference distance $D_{th}$ and the detected amplitude $V_{dt}$ is larger than the reference amplitude $V_{th}$. Then, at the point in time t2 also, the detected distance $D_{dt}$ remains shorter than the reference distance $D_{th}$ and the detected amplitude $V_{dt}$ also remains larger than the reference amplitude $V_{th}$. The situation up to this point in time is the same as that in the case of the detection aspect 2. However, at the point in time t3, the person begins to leave the front of the MFP 10 and leaves the area A2, and therefore, the detected distance $D_{dt}$ of the reflected wave is slightly longer than the reference distance $D_{th}$ and the detected amplitude $V_{dt}$ becomes somewhat smaller. After this, at the point in time t4 at which a predetermined period of time elapses from the point in time t3, in the case where the person becomes more distant from the MFP 10, the detected distance $D_{dt}$ becomes considerably longer than the reference distance $D_{th}$ and the detected amplitude $V_{dt}$ also becomes further smaller. In this case, it is determined that a user expected to have the intention of using the MFP 10 does not exist, and therefore, the MFP 10 continues the sleep mode.

(Detection Aspect 4)

Figure 7:
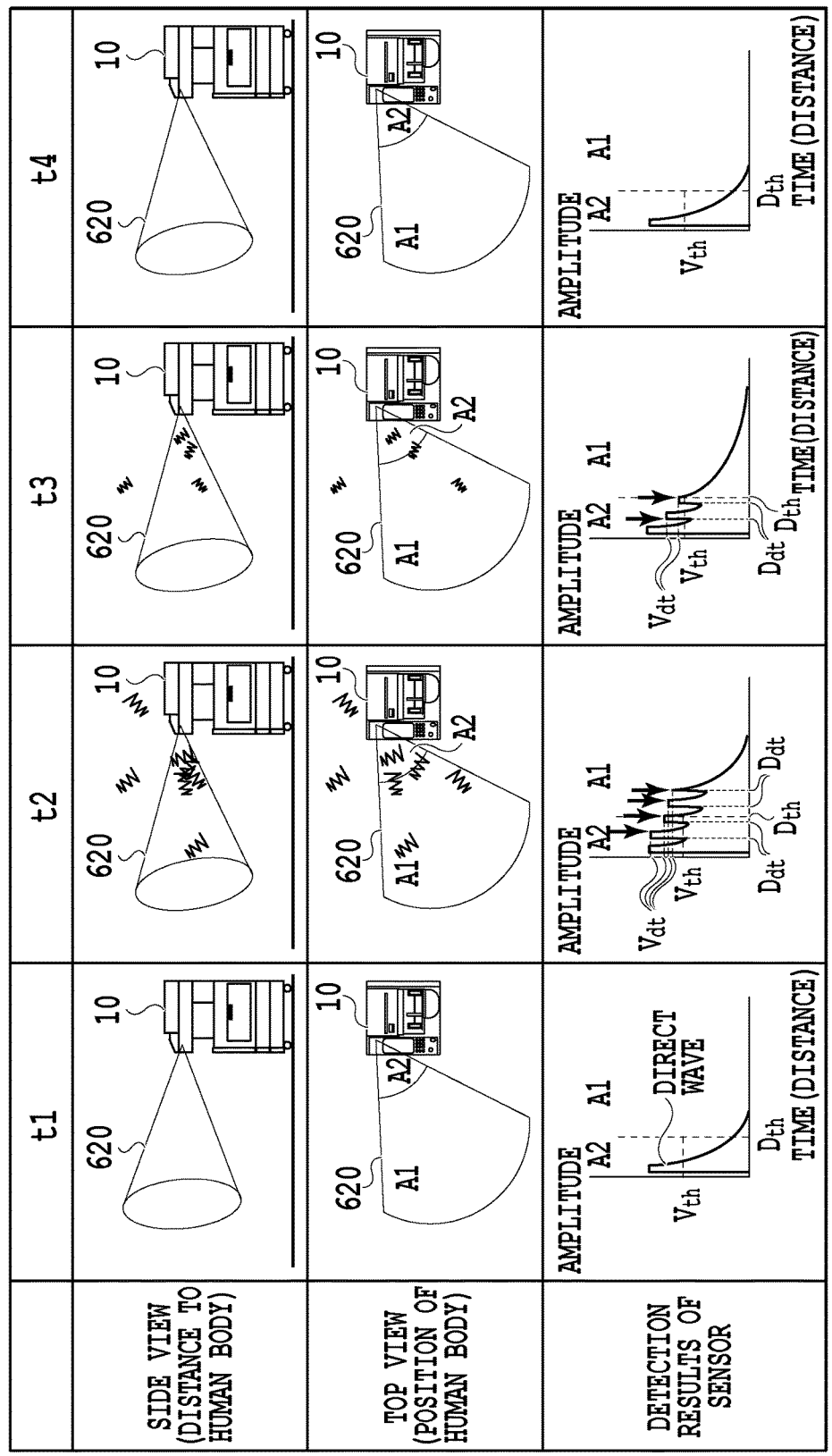
FIG. 7 is a table showing detection results of an ultrasonic sensor in time series in the case where foreign noise of an ultrasonic wave has occurred on the periphery of the MFP.

FIG. 7 is a table showing peripheral situations of the MFP 10 and detection results by the ultrasonic sensor 610 in time series in the case where foreign noise of an ultrasonic wave has occurred on the periphery. Here, the foreign noise is noise including frequencies about 40 KHz the same as that of the ultrasonic wave radiated from the ultrasonic sensor 610 and refers to, for example, sound produced by collision of a metal, sound produced by ejection of contents of a spray can, sound produced by peeling an adhesive tape, and so on. Hereinafter, this is simply referred to as "foreign noise". In the table in FIG. 7, t1 indicates a point in time at which foreign noise does not occur yet, t2 indicates a point in time at which a plurality of foreign noises occurs on the periphery, t3 indicates a point in time at which the foreign noise begins to abate, and t4 indicates a point in time at which the foreign noise abates completely, respectively. In the case of this detection aspect 4, at the point in time t1, the foreign noise does not occur yet and only the direct wave of the ultrasonic wave radiated from the ultrasonic sensor 610 is detected. At the point in time t2, the foreign noise that has occurred is received by the ultrasonic sensor 610 and the detected distance $D_{dt}$ and the detected amplitude $V_{dt}$ are seen in plurality at the same time. The case of the foreign noise is characterized in that what is not detected at the measurement timing of the previous time is detected in plurality at the same time. At the point in time t3, the foreign noise begins to abate and the number of detected distances $D_{dt}$ and detected amplitudes $V_{dt}$ decreases. Then, at the point in time t4 at which the foreign noise abates completely, the same state as that at the point in time t1 is returned. In this case, it is determined that a human body is not detected, and therefore, the MFP 10 continues the sleep mode.

(Detection Aspect 5)

Figure 8:
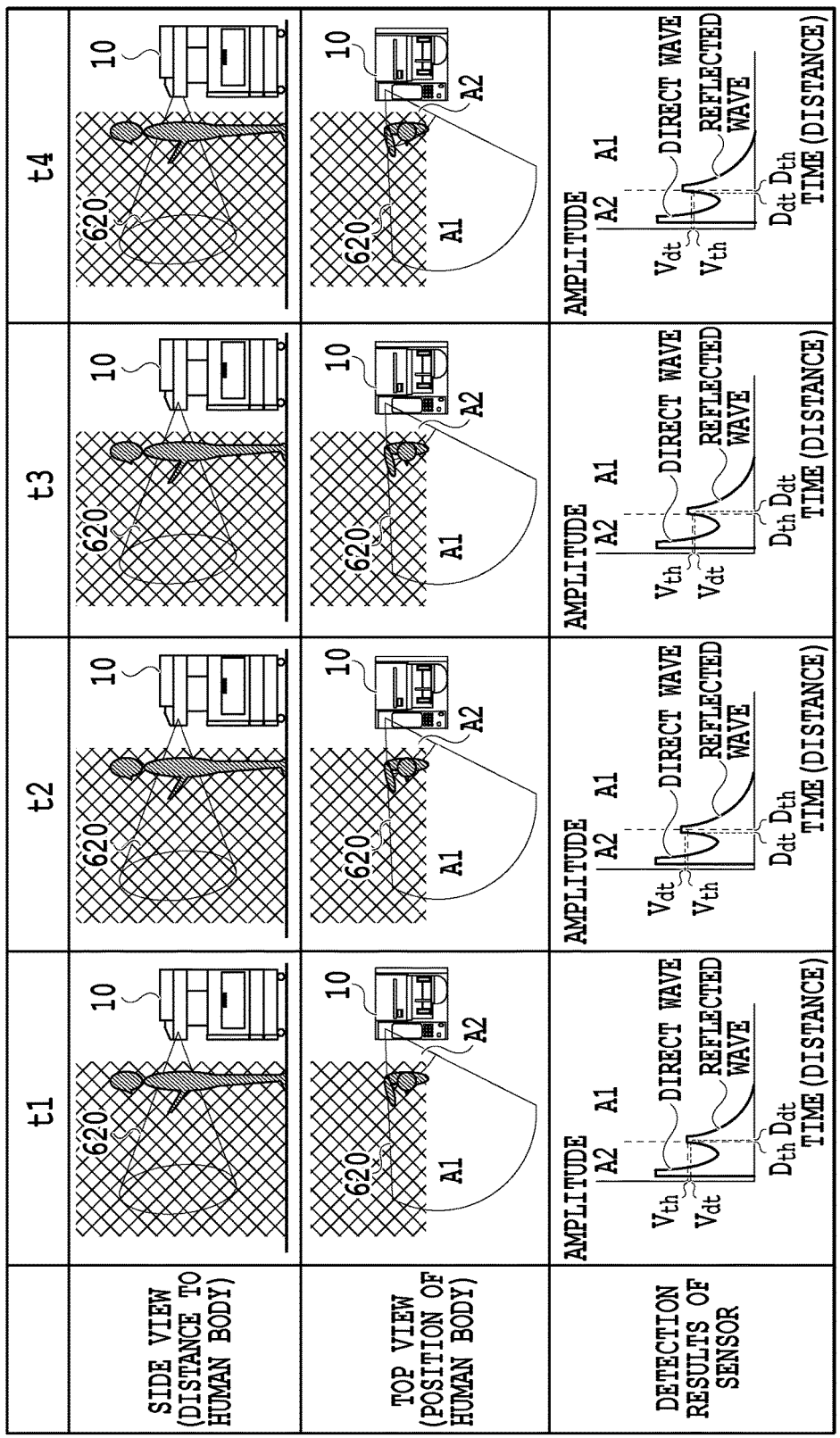
FIG. 8 is a table showing detection results of an ultrasonic sensor in time series in the case where there is a difference in temperature on the periphery of the MFP.

FIG. 8 is a table showing peripheral situations of the MFP 10 and detection results by the ultrasonic sensor 610 in time series in the case where there is a difference in temperature on the periphery. In the table in FIG. 8, the shaded area that exists in the top row and the middle row indicates a portion where a difference in temperature from the periphery is large (portion where temperature is higher than the periphery by, for example, about 5° C.). Such an area where there is a difference in temperature is produced by, in the case where, for example, the MFP 10 is installed near the outlet of an air-conditioner, only part within the detection area 620 being warmed (or cooled) by air output from the air-conditioner. In the case where there is such a difference in temperature within the detection area 620, the operation of the ultrasonic sensor 610 may become unstable. The reason is that the sound speed C and the sound pressure P of the ultrasonic wave, which is a target of detection, are expressed by expression (1) and expression (2) below and these depend on temperature and in the case where the ultrasonic wave passes through a space where there is a difference in temperature, the sound speed C and the sound pressure P change.

$$C=331.5+0.6t \text{ [m/s]} \qquad \text{expression (1)}$$

$$P=\rho Cv \qquad \text{expression (2)}$$

In expression (1) described above, t indicates temperature. Further, in expression (2) described above, ρ indicates the air density and v indicates the speed of a particle. Furthermore, at the time of the ultrasonic wave passing through a space where there is a difference in temperature, refraction occurs at the portions (layers) where temperature is different. Because of this, in the case where a change in temperature occurs continuously within the detection area or in the case where an interface where there is a difference in temperature moves, the oscillated wave and the reflected wave are refracted and the accuracy of the ultrasonic sensor 610 is reduced.

Here, it is assumed that a person continues to stand at the same position near the boundary between the areas A1 and A2 at each of points in time t1 to t4. Then, at the point in time t1, the detected distance $D_{dt}$ does not satisfy the reference distance $D_{th}$ and the detected amplitude $V_{dt}$ also does not satisfy the reference amplitude $V_{th}$ although the difference is small. However, at the point in time t2, despite that the same person continues to stand at the same position, the detection of the ultrasonic wave becomes unstable due to the influence of the difference in temperature and the detect distance $D_{dt}$ satisfies the reference distance $D_{th}$ and the detected amplitude $V_{dt}$ also satisfies the reference amplitude $V_{th}$ although the difference is small. Then, at the point in time t3, despite that the same person continues to stand at the same position, the detected distance $D_{dt}$ does not satisfy the reference distance $D_{th}$ and the detected amplitude $V_{dt}$ also does not satisfy the reference amplitude $V_{th}$ again although the difference is small. Further, at the point in time t4, despite that the same person still continues to stand at the same position, the detected distance $D_{dt}$ satisfies the reference distance $D_{th}$ and the detected amplitude $V_{dt}$ also satisfies the reference amplitude $V_{th}$ again although the difference is small. In the case where there is a boundary at which a difference in temperature larger than or equal to a predetermined one within the detection area 620 as described above, there may be a situation in which the detection of the ultrasonic wave becomes unstable and the detected distance $D_{dt}$ satisfies or does not satisfy the reference distance $D_{th}$ and the detected amplitude $V_{dt}$ also satisfies or does not satisfy the reference amplitude $V_{th}$ despite that a person continues to stand at the same position. However, it is rare for the detected distance $D_{dt}$ to change as described above and it is known experimentally that the amount of change in the detected distance $D_{dt}$ due to the difference in temperature is as small as ignorable in many cases.

FIG. 9A to FIG. 9E are diagrams that put together the detection results of the ultrasonic sensor 610 in the respective situations of the above-described detection aspects 1 to 5. In each graph in FIG. 9A to FIG. 9E, the circular mark indicates the reflected wave detected by the ultrasonic sensor 610 and the graph in the upper row represents the detected distance $D_{dt}$ and the graph in the lower row represents the detected amplitude $V_{dt}$.

In the case where a user approaches from the front in FIG. 9A, as the time elapses from t1 to t3, the detected distance $D_{dt}$ of the reflected wave changes from the long distance to the short distance and at the point in time t4 at which the detected distance $D_{dt}$ is shorter than the reference distance $D_{th}$, almost no change is found. Then, the value of the detected amplitude $V_{dt}$ of the reflected wave becomes larger as the time elapses from t1 to t3 and at the point in time t4 at which the detected amplitude $V_{dt}$ is larger than reference amplitude $V_{th}$, almost no change is found. In the case where a user approaches from the side in FIG. 9B, from the first point in time t1 until the last point in time t4, the detected distance $D_{dt}$ is shorter than the reference distance $D_{th}$ at all times and the detected amplitude $V_{dt}$ is larger than the reference amplitude $V_{th}$. Then, in the case where a passerby crosses in FIG. 9C, from the first point in time t1 until the point in time t3, the detected distance $D_{dt}$ and the detected amplitude $V_{dt}$ are the same as those in the case where a user approaches from the side in FIG. 9B. However, at the last point in time t4, the detected distance $D_{dt}$ exceeds the reference distance $D_{th}$ and the detected amplitude $V_{dt}$ falls below the reference amplitude $V_{th}$.

On the other hand, in the case where there is foreign noise of an ultrasonic wave on the periphery in FIG. 9D, at certain points in time (in this example, t2 and t3), ultrasonic waves at a plurality of amplitude levels are detected at a plurality of distances at a time. There are five circular marks indicating the detected distance $D_{dt}$ at the point in time t2, but there are four circular marks indicating the detected amplitude $V_{dt}$ and this means that the reflected waves having different distances but having the same amplitude are detected. Further, in the case where there is a difference in temperature within the detection area 620 in FIG. 9E, the detected distance $D_{dt}$ and the detected amplitude $V_{dt}$ repeatedly increase and decrease with predetermined values (in this example, the reference distance $D_{th}$ and the reference amplitude $V_{th}$) being sandwiched in between.

In the present embodiment, control that is explained below is performed in order to eliminate erroneous detection as much as possible by taking into consideration various detection aspects of the ultrasonic sensor 610 described above.

Figure 10B:
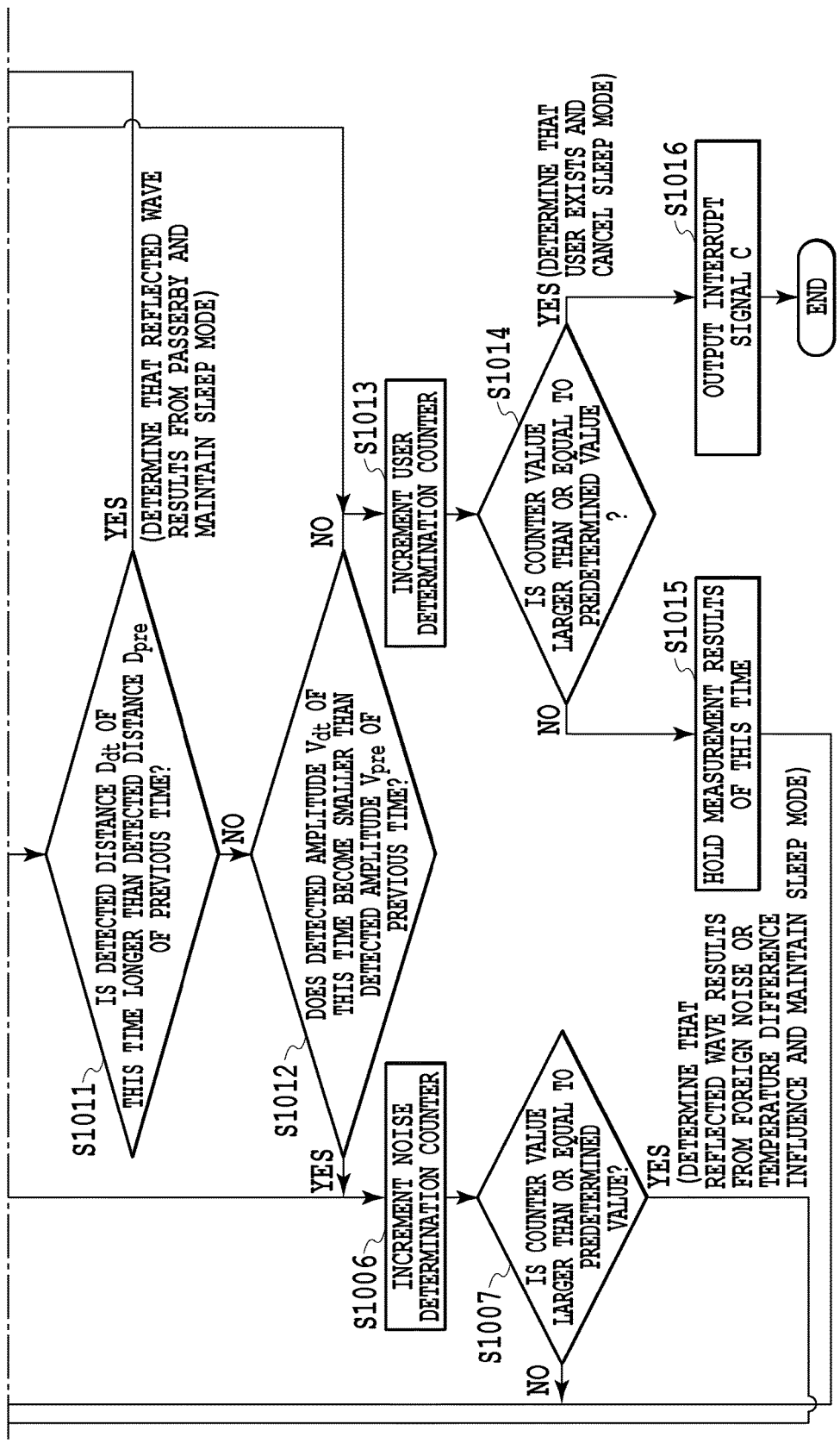
FIG. 10 is a diagram showing a relationship between FIGS. 10A and 10B, and FIGS. 10A and 10B are flowcharts showing a flow of user detection control based on measurement results of an ultrasonic sensor.

FIGS. 10A and 10B are flowcharts showing a flow of user detection processing using the human sensor unit 600 in the sleep mode, which is performed by the microcontroller 514 of the MFP 10. In this flow, it should be noted that necessary processing is described by focusing attention only on control to suppress erroneous detection due to foreign noise and a difference in temperature, which is the object of the present invention.

At step 1001, parameters to be used for various kinds of determination processing that follow are initialized (zero is set as the initial value). Specific parameters are as follows.

(Most recent) measurement results of the previous time (detected distance $D_{pre}$ and detected amplitude $V_{pre}$) of reflected waves Noise determination counter N that counts in the case where the possibility that a detected reflected wave results from foreign noise or a difference in temperature is strong User determination counter C that counts in the case where the possibility that a detected reflected wave results from a user expected to have the intention of using the MFP 10 is strong At step 1002, whether the timing of reflected wave measurement by the ultrasonic sensor 610 has reached is determined. In the case where an elapse of a predetermined period of time (e.g., 100 msec) specifying the timing of reflected wave measurement is checked by the timer (not shown schematically) within the microcontroller 514, the processing advances to step 1003.

At step 1003, based on the instructions from the microcontroller 514, radiation of ultrasonic waves and measurement of the reflected waves thereof are performed by the ultrasonic sensor 610 and in the case where the reflected wave can be measured, the detected distance $D_{dt}$ and the detected amplitude $V_{dt}$ described previously are acquired. In the measurement, as described previously, the direct wave is also detected, but by taking only the measurement results after a predetermined period of time elapses from the suspension of oscillation of the ultrasonic wave as acquisition targets, the measurement results of the direct wave are excluded.

At step 1004, whether or not the detected amplitude $V_{dt}$ acquired at step 1003 is larger than or equal to the reference amplitude $V_{th}$ described previously is determined. At this time, in the case where a plurality of detected amplitudes $V_{dt}$ is acquired at step 1003, only the detected amplitude $V_{dt}$ whose oscillation level is the highest is the determination target. In the case where no reflected wave is detected as a result of measurement, determination is performed by taking the value of the detected amplitude $V_{dt}$ as zero. In the case where the results of the determination indicate that the detected amplitude is less than the reference amplitude ($V_{dt} < V_{th}$), the processing returns to step 1001 and each parameter is initialized. On the other hand, in the case where the detected amplitude is larger than or equal to the reference amplitude ($V_{dt} \geq V_{th}$), the processing advances to step 1005.

At step 1005, whether a plurality of reflected waves whose amplitude is larger than or equal to the predetermined value is detected (whether or not the number of detected distances $D_{dt}$ acquired at step 1003 is two or more) is determined. In the case where reflected waves corresponding to a plurality of distances are acquired by one-time measurement, there is a possibility that the reflected wave results from foreign noise. Consequently, in the case where the number of acquired detected distances $D_{dt}$ is two or more, the processing advances to step 1006. On the other hand, in the case where the number of acquired detected distances $D_{dt}$ is not two or more, the processing advances to step 1008. A configuration may also be accepted in which whether the number of times the distance is measured is larger than or equal to a number of times determined in advance (integer not smaller than 3) is determined in place of determining whether the number of detected distances is two or more.

At step 1006, the count value of the noise determination counter N is incremented. Then, whether the counter value after increment is larger than or equal to a predetermined value is determined (step 1007). Here, the predetermined value (threshold value) is arbitrary and it is sufficient to determine by taking into consideration the predetermined period of time at step 1002 and the like. In the case where the count value of the noise determination counter N is larger than or equal to a predetermined value (e.g., 5), it is determined that the detected series of reflected waves results from foreign noise (including unstableness resulting from a difference in temperature, as will be described later). In this case, the processing returns to step 1001 and all the parameters including the noise determination counter N are initialized. As a result of this, the sleep mode is maintained and the user detection processing is continued. It may also be possible to use separate counters for foreign noise and for temperature difference influence as the noise determination counter.

At step 1008, whether the measurement results of the previous time (detected distance $D_{pre}$ and detected amplitude $V_{pre}$) are held is determined. In the case where the measurement results of the previous time are held, the processing advances to step 1010. On the other hand, in the case where the measurement results of the previous time are not held, the measurement results of this time (detected distance $D_{dt}$ and detected amplitude $V_{dt}$) acquired at step 1003 are stored and held in the memory within the microcontroller 514 as the detected distance $D_{pre}$ and the detected amplitude $V_{pre}$ (step 1009). After the measurement results of this time are held in this manner, the processing returns to step 1002 and the user detection processing is continued.

At step 1010, whether the detected distance $D_{dt}$ of the measurement results acquired at step 1003 is shorter than the detected distance $D_{pre}$ of the previous time acquired and held in the most recent loop is determined. In the case where a user is approaching the MFP 10, the value of detected distance $D_{dt}$ should be smaller than the value of the detected distance $D_{pre}$ of the previous time, and therefore, at this step, this point is determined. In the case where the results of the determination indicate that the detected distance $D_{dt}$ is shorter than the detected distance $D_{pre}$ of the previous time, the processing advances to step 1013. On the other hand, in the case where the detected distance $D_{dt}$ is not shorter than the detected distance $D_{pre}$ of the previous time, the processing advances to step 1011.

At step 1011, whether the detected distance $D_{dt}$ acquired at step 1003 is longer than the detected distance $D_{pre}$ of the previous time is determined. In the case where a user is leaving the MFP 10, the value of the detected distance $D_{dt}$ should be larger than the value of the detected distance $D_{pre}$ of the previous time, and therefore, at this step, this point is determined. In the case where the results of the determination indicate that the detected distance $D_{dt}$ is longer than the detected distance $D_{pre}$ of the previous time, it is determined that the detected reflected wave does not result from a user expected to have the intension of using the MFP 10 but from a passerby, and the processing returns to step 1001. Due to this, each parameter described previously is initialized. As a result of this, the sleep mode is maintained and the user detection processing is continued. On the other hand, in the case where the detected distance $D_{dt}$ is not longer than the detected distance $D_{pre}$ of the previous time (i.e., there is no change), the processing advances to step 1012.

At step 1012, whether the detected amplitude $V_{dt}$ acquired at step 1003 becomes smaller than the detected amplitude $V_{pre}$ of the previous time acquired and held in the most recent loop is determined. In the case where there is no change both in the detected distance and in the detected amplitude, it is possible to determine that a person continues to exist at the same position and in the case where the detected amplitude becomes smaller despite that there is no change in the detected distance, it is possible to determine that this results from a difference in temperature in the peripheral environment. At this step, this point is determined. In the case where the results of the determination indicate that the detected amplitude $V_{dt}$ becomes smaller than the detected amplitude $V_{pre}$ of the previous time, it is determined that the measurement becomes unstable due to a difference in temperature, and the noise determination counter N is incremented (step 1006). On the other hand, in the case where the detected amplitude $V_{dt}$ does not become smaller than the detected amplitude $V_{pre}$ of the previous time, the processing advances to step 1013.

At step 1013, the user determination counter C is incremented. Then, at step 1014, whether the count value of the user determination counter C is larger than or equal to a predetermined value is determined. Here, the predetermined value (threshold value) is arbitrary and it is sufficient to determine by taking into consideration the predetermined period of time at step 1002 and the like. In the case where the count value of the user determination counter C is larger than or equal to a predetermined value (e.g., 5), it is determined that a user expected to have the intention of using the MFP 10 exists in front of the apparatus and the processing advances to step 1016. On the other hand, in the case where the count value of the user determination counter C is less than the predetermined threshold value, the detected distance $D_{dt}$ and the detected amplitude $V_{dt}$, which are the measurement results of this time, are stored and held in the memory within the microcontroller 514 as the detected distance $D_{pre}$ and the detected amplitude $V_{pre}$ (step 1015). After the measurement results of this time are held, the processing returns to step 1002 and the user detection processing is continued.

At step 1016, the interrupt signal C described previously is output to the power source control unit 211. The power source control unit 211 cancels the sleep mode (shifts the MFP 10 into the standby mode) in response to this interrupt signal C. Due to this, the MFP 10 enters the state where a user can use the MFP 10.

The above is the contents of the user detection processing using the human sensor unit 600 in the sleep mode. In the present embodiment, explanation is given to the user detection processing in the scene where the standby mode is resumed from the sleep mode, but the scene to which the present invention can be applied is not limited to this. For example, it may also be possible to design a configuration in which the above-described detection processing capable of distinguishing a user from foreign noise and the like is performed in the standby mode and in the case where it is determined that the user has left the detection area, the power source control unit 211 is notified of the results of the determination, and upon receipt of this notification, the power source control unit 211 changes the power mode from the standby mode into the sleep mode.

According to the present embodiment, even in the environment in which foreign noise that causes erroneous detection has occurred or there is a difference in temperature, it is possible to prevent erroneous detection by the ultrasonic sensor.

The processing performed by the microcontroller 514 shown in the present embodiment may be implemented by a GPU (Graphics Processing Unit), an ASIC (Application Specific Integrated Circuit), an FPGA (Field-Programmable Gate Array), and so on. Further, part of the processing to be performed may be implemented by hardware.

In the present embodiment, explanation is given by using a multi function printer as an example of an electronic apparatus to which the present invention can be applied, but the electronic apparatus to which the present invention can be applied is not limited to this. For example, the electronic apparatus may be a personal computer, a home electrical appliance, and so on, which performs object detection by using a range sensor, such as an ultrasonic sensor.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, even in the environment in which foreign noise that causes the above-described erroneous detection has occurred or there is a difference in temperature within the detection area, it is possible to prevent erroneous detection by the ultrasonic sensor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-150360 filed Jul. 29, 2016, which is hereby incorporated by reference wherein in its entirety.

What is claimed is:

1. An information processing apparatus comprising:
a sound wave sensor that outputs a sound wave and receives a reflected wave of the output sound wave;
a control unit that stores a plurality of amplitudes of sound waves which are received by the sound wave sensor during a predetermined time interval; and
a power control unit that shifts a power state of the information processing apparatus from a first power state into a second power state where power consumption is larger than that in the first power state, on a basis that a received sound wave is of an amplitude that is larger than or equal to a threshold value, in a case where, among the plurality of the amplitudes of the sound waves received in the predetermined time interval, the number of the amplitudes that are larger than or equal to the threshold value is equal to or smaller than a predetermined number, and maintains the power state of the information processing apparatus in the first power state in a case where, among the plurality of amplitudes of the sound waves received during the predetermined time interval, the number of the amplitudes of the sound waves that are larger than or equal to the threshold value is larger than the predetermined number.

2. The information processing apparatus according to claim 1, wherein the control unit performs measurement of the amplitudes at predetermined time intervals and stores the plurality of measured amplitudes, and performs measurement again in a case where a number of distances that are obtained in one time measurement is two or more, the distance being represented by the time elapsed between the sound wave sensor radiating a sound wave and the sound wave sensor receiving the sound wave.

3. The information processing apparatus according to claim 2, wherein the control unit has a counter that counts each time sound waves corresponding to a plurality of distances are received by one-time measurement, and
the control unit performs again the measurement at predetermined time intervals in a case where a counter value of the counter becomes larger than or equal to a predetermined value.

4. The information processing apparatus according to claim 1, wherein the control unit measures the amplitudes at predetermined time intervals, and in results of the measurement at the predetermined time intervals, in a case where a distance corresponding to an amplitude of a sound wave received by a first measurement is longer than a distance corresponding to an amplitude of a sound wave received by a second measurement that is a measurement before the first measurement, the control unit performs again the measurement at predetermined time intervals.

5. The information processing apparatus according to claim 1, wherein the control unit measures the amplitudes at predetermined time intervals, and in results of the measurement at the predetermined time intervals, in a case where there is no change between a distance corresponding to an amplitude of a sound wave received by a first measurement and a distance corresponding to an amplitude of a sound wave received by a second measurement that is a measurement before the first measurement, and the amplitude of the sound wave received by the first measurement becomes smaller than the amplitude of the sound wave received by the second measurement, the control unit performs again the measurement at predetermined time intervals.

6. The information processing apparatus according to claim 5, wherein the control unit has a counter that counts each time it is determined that, in results of the measurement at the predetermined time intervals, there is no change between the distance corresponding to a sound wave received by the first measurement and the distance corresponding to a sound wave received by the second measurement that is the measurement before the first measurement and the amplitude of the sound wave received by the first measurement becomes smaller than the amplitude of the sound wave received by the second measurement, and the control unit performs again the measurement at predetermined time intervals in a case where a counter value of the counter becomes larger than or equal to a predetermined value.

7. The information processing apparatus according to claim 1, wherein the control unit measures the amplitudes at predetermined time intervals, and in results of the measurement at the predetermined time intervals, in a case where the amplitude of the received sound wave is larger than or equal to a threshold value and a distance corresponding to a sound wave received by first measurement is shorter than a distance corresponding to a sound wave measured by second measurement that is measurement before the first measurement, the power control unit shifts the information processing apparatus into the second power state.

8. The information processing apparatus according to claim 7, wherein the control unit has a counter that counts each time it is determined that, in results of the measurement at the predetermined time intervals, the distance corresponding to a sound wave received by the first measurement is shorter than the distance corresponding to a sound wave received by the second measurement in a case where the amplitude of the received sound wave is larger than or equal to a threshold value, and the power control unit shifts the information processing apparatus into the second power state in a case where a counter value of the counter becomes larger than or equal to a predetermined value.

9. A control method of an information processing apparatus, the information processing apparatus including: a sound wave sensor that outputs a sound wave and receives a reflected wave of the output sound wave; and a control unit that stores a plurality of amplitudes of sound waves which are received by the sound wave sensor during a predetermined time interval, the method comprising:

a determination step of determining whether an amplitude of a reflected wave is larger than or equal to a threshold value; and a power control step of shifting, in a case where it is determined that the amplitude of the sound wave is larger than or equal to the threshold value at the determination step, a power state of the information processing apparatus from a first power state into a second power state where power consumption is larger than that in the first power state in a case where, among the plurality of stored amplitudes of the sound waves received in the predetermined time interval, the number of amplitudes that are larger than or equal to the threshold value is equal to or smaller than a predetermined number, and maintaining the power state of the information processing apparatus in the first power state in a case where, among the plurality of stored amplitudes of the sound waves received in the predetermined time interval, the number of the amplitudes of the sound waves that are larger than or equal to the threshold value is larger than the predetermined number.

10. A non-transitory computer readable storage medium storing a program for causing a computer to perform a control method of an information processing apparatus including: a sound wave sensor that outputs a sound wave and receives a reflected wave of the output sound wave; and a control unit that stores a plurality of amplitudes of sound waves which are received by the sound wave sensor during a predetermined time interval, the program comprising:

code for a determination step of determining whether an amplitude of a reflected wave is larger than or equal to a threshold value; and code for a power control step of shifting, in a case where it is determined that the amplitude of the sound wave is larger than or equal to the threshold value at the determination step, a power state of the information processing apparatus from a first power state into a second power state where power consumption is larger than that in the first power state in a case where, among the plurality of stored amplitudes of the sound waves received in the predetermined time interval, the number of amplitudes that are larger than or equal to the threshold value is equal to or smaller than a predetermined number, and maintaining the power state of the information processing apparatus in the first power state in a case where, among the plurality of stored amplitudes of the sound waves received in the predetermined time interval, the number of the amplitudes of the sound waves that are larger than or equal to the threshold value is larger than the predetermined number.

* * * * *